(12) United States Patent
Dapp et al.

(10) Patent No.: US 7,415,331 B2
(45) Date of Patent: Aug. 19, 2008

(54) SYSTEM FOR CONTROLLING UNMANNED VEHICLES

(75) Inventors: Michael C. Dapp, Endwell, NY (US); Adam Jung, Owego, NY (US); Robert J. Szczerba, Endicott, NY (US); Paul W. Thurm, Apalachin, NY (US); Joel J. Tleon, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 483 days.

(21) Appl. No.: 11/188,829

(22) Filed: Jul. 25, 2005

(65) Prior Publication Data

US 2007/0032920 A1 Feb. 8, 2007

(51) Int. Cl.
*G01C 23/00* (2006.01)
*G05D 1/00* (2006.01)

(52) U.S. Cl. .......................................... 701/25; 701/117
(58) Field of Classification Search ........................ None
See application file for complete search history.

(56) References Cited

U.S. PATENT DOCUMENTS

| | | | |
|---|---|---|---|
| 5,208,750 A | 5/1993 | Kurami et al. | |
| 5,646,845 A | 7/1997 | Gudat et al. | |
| 6,122,572 A | 9/2000 | Yavnai | |
| 6,175,783 B1 | 1/2001 | Strength et al. | |
| 6,353,734 B1 | 3/2002 | Wright et al. | |
| 6,487,500 B2 | 11/2002 | Lemelson et al. | |
| 6,498,968 B1 | 12/2002 | Bush | |
| 6,505,100 B1 | 1/2003 | Stuempfle et al. | |
| 6,654,669 B2 | 11/2003 | Eisenmann et al. | |
| 6,665,594 B1 | 12/2003 | Armstrong | |
| 6,675,081 B2 | 1/2004 | Shuman et al. | |
| 6,772,055 B2 | 8/2004 | Hagelin | |
| 6,842,674 B2 * | 1/2005 | Solomon ...................... 701/23 |
| 6,845,949 B2 | 1/2005 | Blackwell-Thompson et al. | |
| 6,873,886 B1 | 3/2005 | Mullen et al. | |
| 7,047,861 B2 * | 5/2006 | Solomon ...................... 89/1.11 |
| 2002/0045952 A1 | 4/2002 | Blemel | |
| 2002/0161489 A1 | 10/2002 | Johnson | |

(Continued)

OTHER PUBLICATIONS

"A Distributed Architecture for Autonomous Unmanned Aerial Vehicle Experimentation", Author(s): P. Doherty, P. Haslum, F. Heintz, T. Merz, P. Nyblom, T. Persson, and B. Wingman.

(Continued)

*Primary Examiner*—Michael J. Zanelli
(74) *Attorney, Agent, or Firm*—Tarolli, Sundheim, Covell & Tummino LLP

(57) ABSTRACT

A system ensures safety and security of teams of collaborative autonomous unmanned vehicles in executing a mission plan. The system includes a plurality of components, a first device, a second device, and a third device. The plurality of components perform situation analysis, mission planning, mission replanning, mission plan execution, and collaboration between the autonomous unmanned vehicles. The first device identifies safety critical components of the plurality of components. The second device identifies security sensitive components of the plurality of components. The third device isolates the safety critical components from contamination by other components of the plurality of components. The third device isolates security sensitive data from contaminating non-security sensitive components of the plurality of components.

20 Claims, 12 Drawing Sheets

U.S. PATENT DOCUMENTS

| | | |
|---|---|---|
| 2003/0120620 A1 | 6/2003 | Fromherz et al. |
| 2003/0135678 A1 | 7/2003 | Andre |
| 2004/0068415 A1 | 4/2004 | Solomon |
| 2004/0160319 A1 | 8/2004 | Joao |
| 2004/0174822 A1 | 9/2004 | Bui |
| 2004/0268030 A1 | 12/2004 | Cheung |
| 2005/0004723 A1 | 1/2005 | Duggan et al. |

OTHER PUBLICATIONS

"Note on Internet mission control of the ROMEO Unmanned Underwater Vehicle using the CORAL Mission Controller": Author(s): Ga. Bruzzone, R. Bone, M. Caccia, G. Veruggio.

"Control System Architecture for Military Robotics", source(s): http://museum.nist.Gov/exhibits/timeline/printerFriendly.cfm?itemId=38.

* cited by examiner

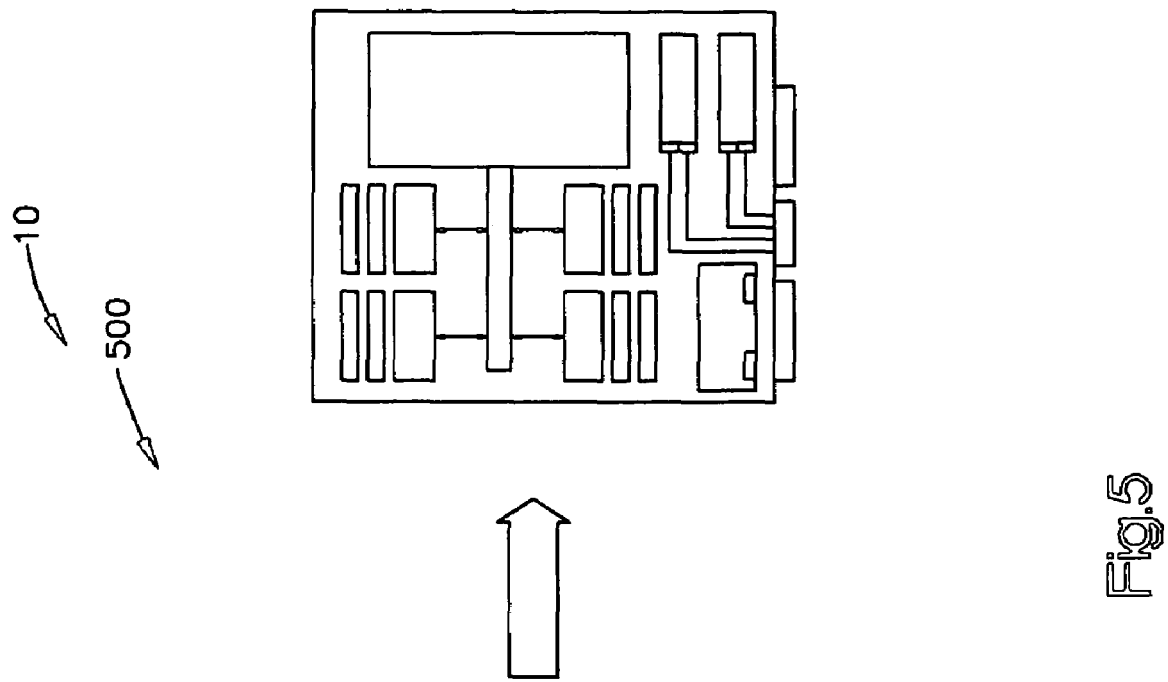
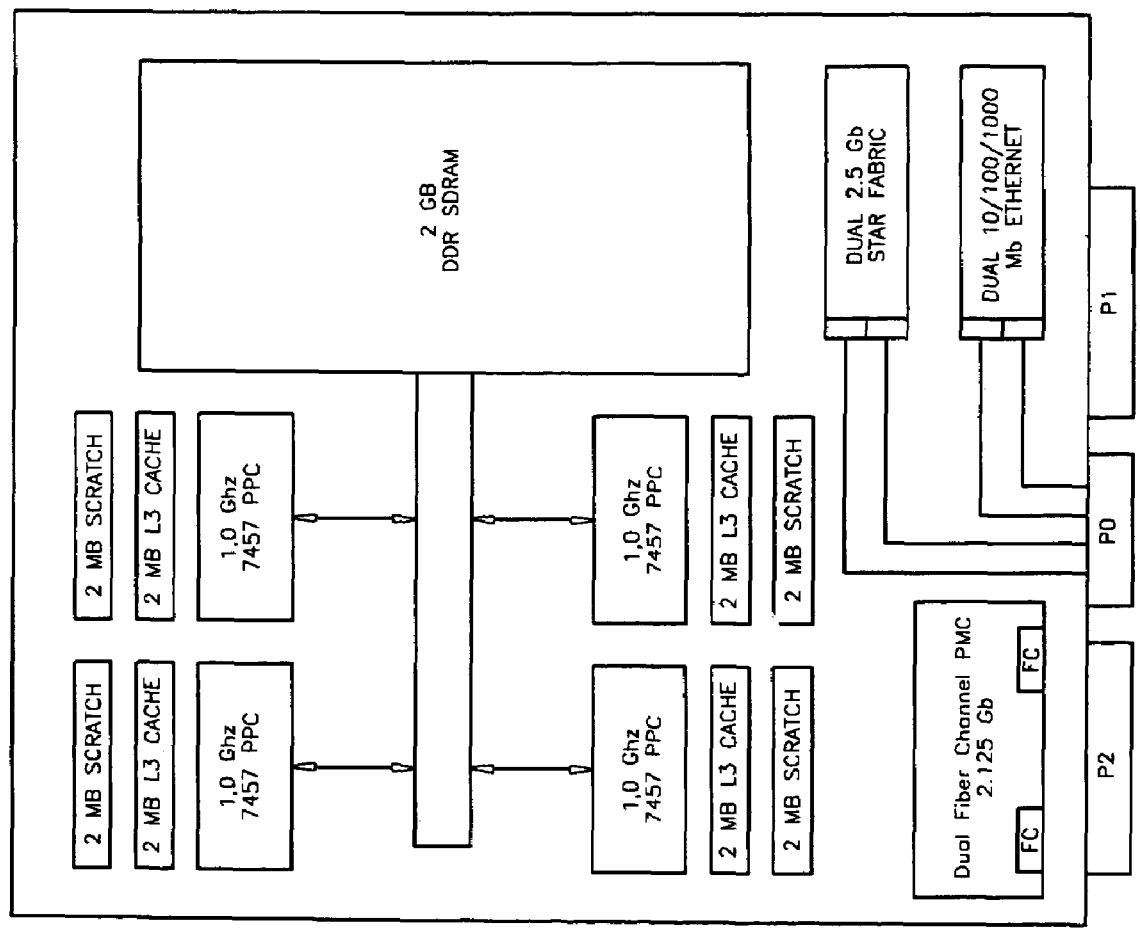
Fig. 5

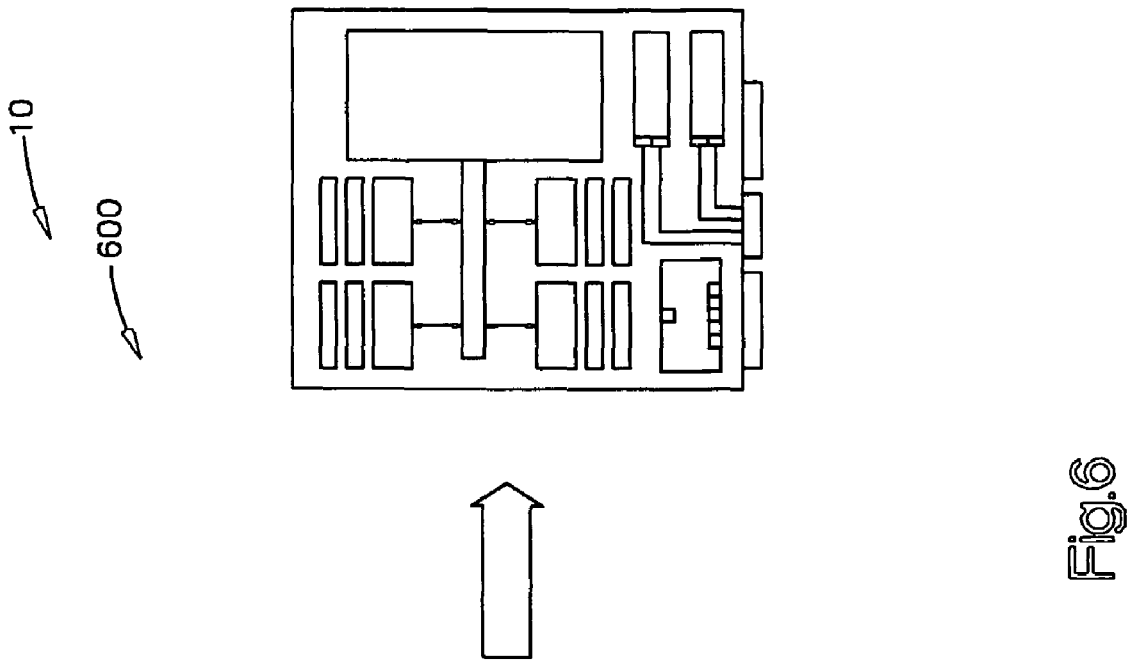
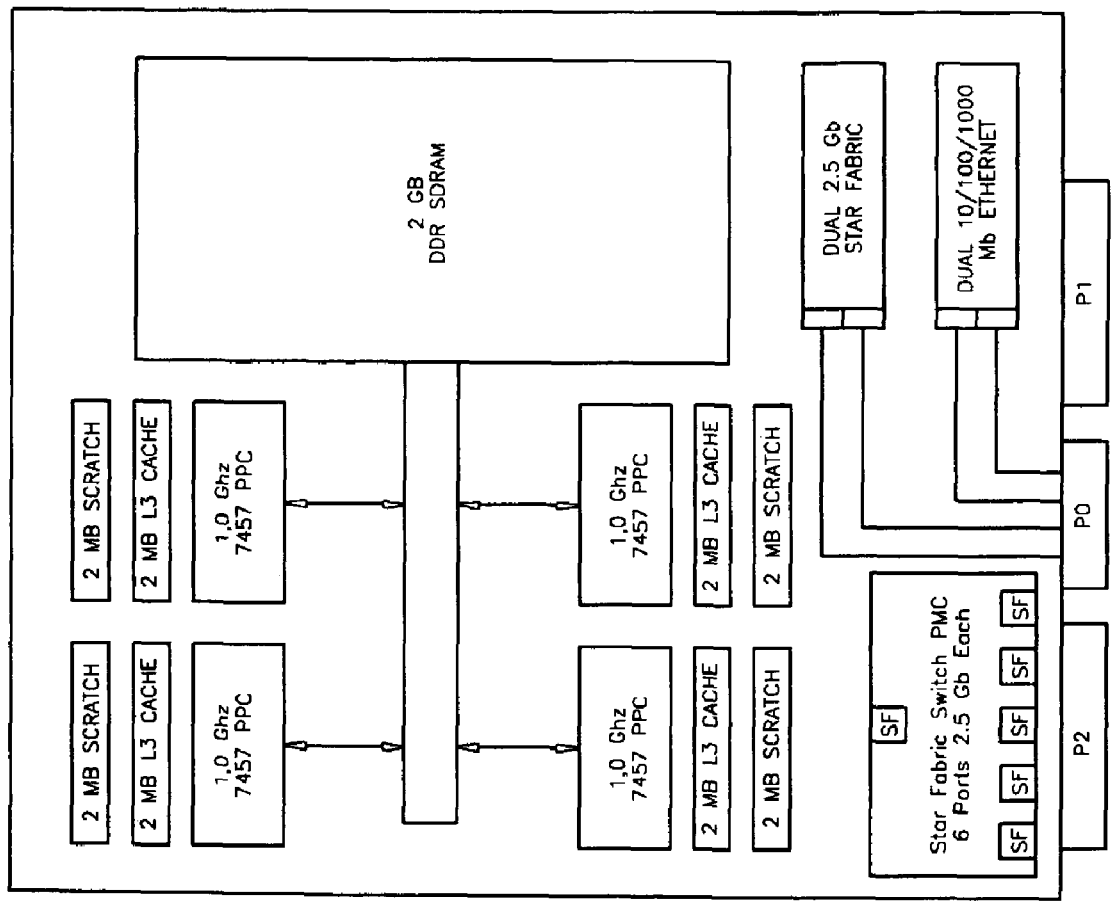
Fig. 6

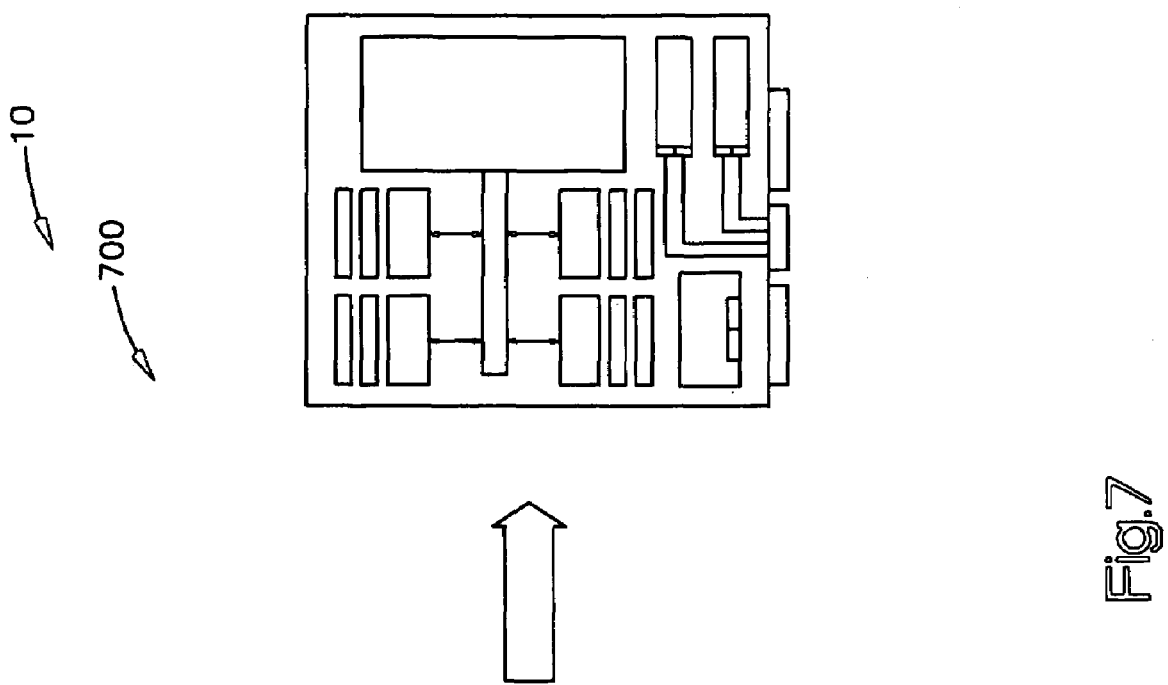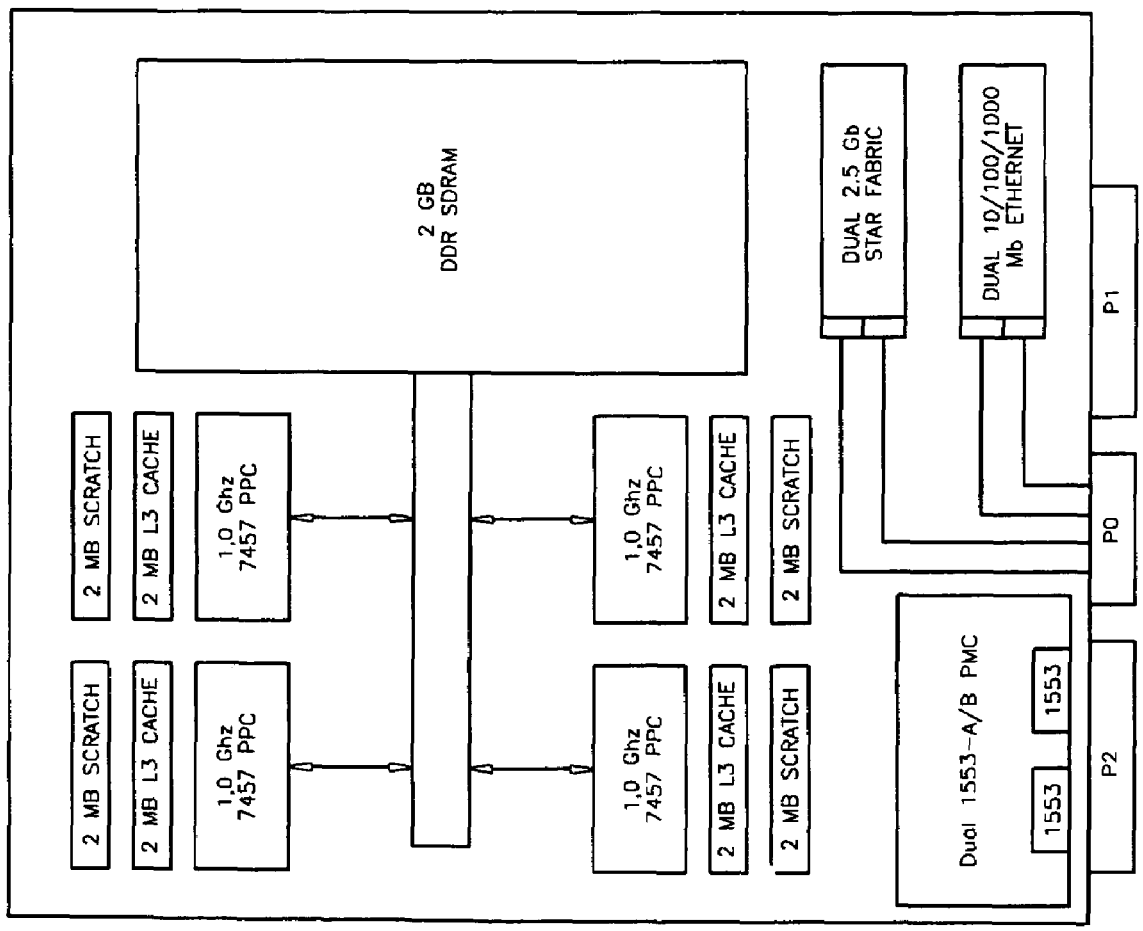
Fig.7

Quad PPC Cluster VME Board Features:
- 4 x PPC 7447 at 1.0 Ghz
- 4 Way Distributed Memory Clustered Multiprocessor
- 32K Integrated L1 I-Cache
- 32K Integrated L1 D-Cache
- 512K Integrated Unified L2 Cache
- 256/512 MB DDR SDRAM Memory/Processor
  - 1,000 Gbyte/sec Peak Data Rate
- Discovery II High Performance Crossbar
- 125 Mhz Memory/System Controller
  - 1000 Mbyte/sec Peak Data Rate
- 1/2 GB DDR SDRAM Total per Card
- 128 MB Flash
- 2 x 64 bit PMC Site 33/66 Mhz
  - 528 Mbyte/sec Peak Data Rate at 66 Mhz
- I/O:
  - 1 x 10/100/1000 Mbits/sec Ethernet
  - 1 x 10/100 Mbits/sec Ethernet
  - 2 x Serial-EIA-232/422
  - 1 x Serial-EIA-232
- VxWorls, Integrity, TimeSys Linux

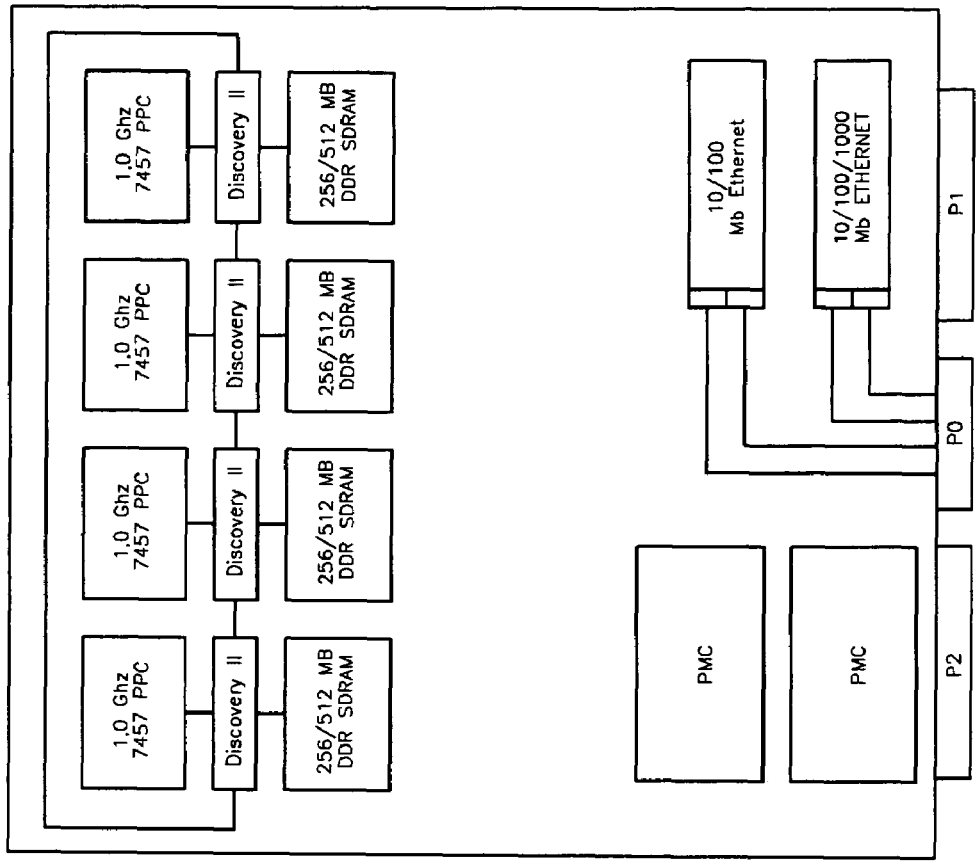

Fig.8

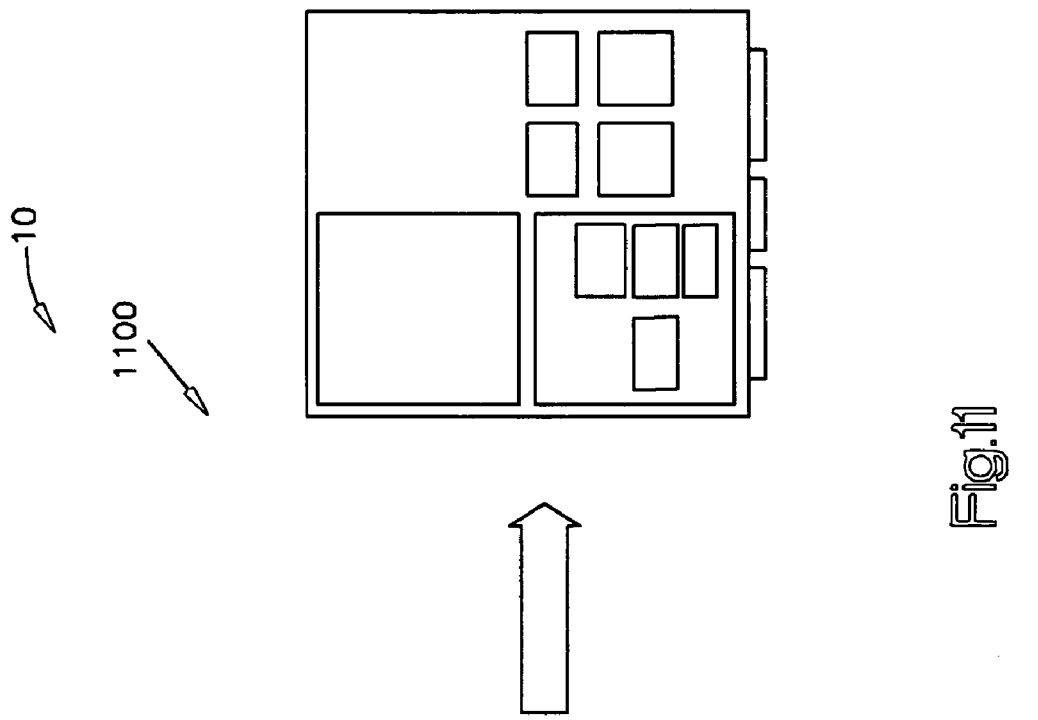
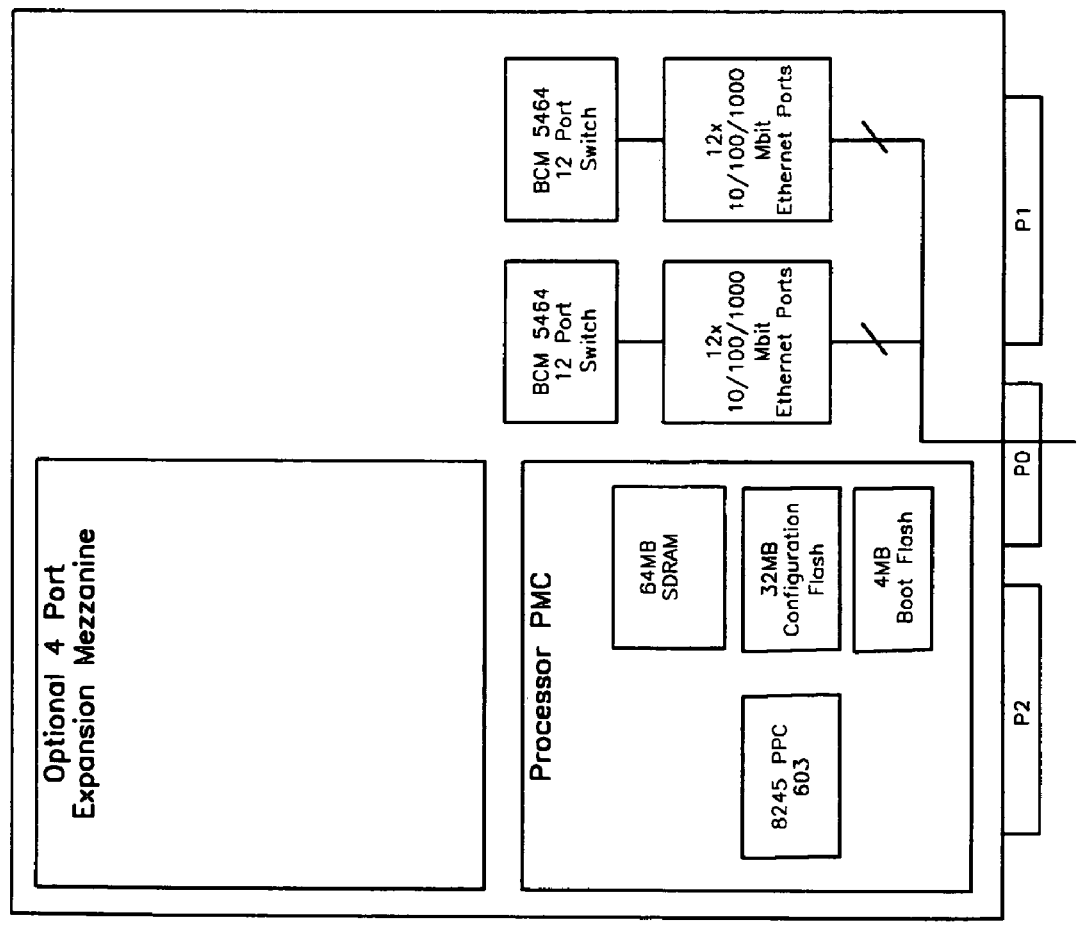
Fig. 11

SYSTEM FOR CONTROLLING UNMANNED VEHICLES

FIELD OF INVENTION

The present invention relates to a system for collaborating operation of vehicles, and more specifically, to a system for autonomously collaborating teams of unmanned vehicles.

BACKGROUND OF THE INVENTION

Conventionally, remote stations control unmanned vehicles. Alternatively, unmanned vehicles may be self-controlled or autonomously controlled. Another option is collaborative team control—a team of autonomous systems of the unmanned vehicles collaborating and coordinating autonomously.

These conventional approaches may, for example, aid a Warfighter in his duties. Conventional approaches may extend the vision and the reach of the Warfighter. However, the Warfighter may spend so much time managing assets that the Warfighter may lose effectiveness as a Warfighter. Autonomy may relieve the Warfighter of this burden. By moving the role of the Warfighter from control to command, unmanned systems may move from force extension to force expansion. Collaboration may move unmanned systems from force expansion to force multiplication. Force multiplication allows the Warfighter to perform its duties more effectively, more successfully, and more decisively.

Autonomous systems must be aware of their environment and adapt plans based on changes in their understanding of their environment. Control, therefore, must be flexible, both in development and in execution.

An autonomous system may be given objectives to achieve. These objectives may be as simple as monitor state and report problems or complex, for example, assault and capture a target area. In addition, an autonomous system may be given constraints, such as flight corridors, acceptable risks, or authorized targets.

A goal of an autonomous system may be to integrate these objectives and constraints with environmental state and system state to execute a mission plan in order to achieve the given objectives without violating the given constraints.

Also, autonomous systems may themselves consist of autonomous systems. Thus, autonomy may also be collaborative, coordinating multiple autonomous systems to act in concert. In addition, a team may have access to assets external to the autonomous team that would aid in performance of a mission. These assets may also be used in concert with the autonomous team(s).

Collaborative autonomy may be only one part of an autonomous system, which, in turn, may be part of a collaborative team. Collaboration provides interaction with the other parts of the system in order to be effective.

This level of autonomy and flexibility may require substantial amounts of computing resources to be used in a versatile manner. Military autonomous aerial vehicles may have additional requirements. Because military vehicles are typically aerial vehicles, military vehicles also have safety requirements. Because these vehicles are military, these vehicles may have the potential to possess and use sensitive information as part of their autonomy. Precautions may be implemented to protect this sensitive information.

Conventional approaches are monolithic insofar as the approaches have sought a single control system that performs all required functions. These approaches fail to recognize different disciplines required to perform various functions.

For example, a system typically should be aware of its environment. Awareness may be provided by inferences and estimates of probabilities in a data rich environment. This discipline may be different from mission planning, which takes an estimate of the environment and attempts to optimize courses of action that may effect change to the environment.

Conventional unmanned vehicle control systems are designed to meet specific requirements. These systems are typically designed for a specific vehicle with specific requirements. This approach typically reduces, if not eliminates, reusability of the system. Thus, each new vehicle development effort is large and inefficient.

These factors have likewise driven conventional designs to dedicated, specific, and inflexible hardware/software architectures to support these control systems. However, this approach fails to support the flexible, adaptable requirements of an autonomous system in a rapidly changing battlefield environment.

Because of this monolithic nature of conventional systems, separation of critical safety and security classification issues has been required within the control system itself, rather than in an infrastructure supporting the system. Thus, development and maintenance of the system is cumbersome. Furthermore, changes to the conventional system require reevaluation, if not certification of the entire system.

SUMMARY OF THE INVENTION

A system in accordance with the present invention ensures safety and security of teams of collaborative autonomous unmanned vehicles in executing a mission plan. The system includes a plurality of components, a first device, a second device, and a third device. The plurality of components perform situation analysis, mission planning, mission replanning, mission plan execution, and collaboration between the autonomous unmanned vehicles. The first device identifies safety critical components of the plurality of components. The second device identifies security sensitive components of the plurality of components. The third device isolates the safety critical components from contamination by other components of the plurality of components. The third device isolates security sensitive data from contaminating non-security sensitive components of the plurality of components.

A computer program product in accordance with the present invention ensures safety and security of teams of collaborative autonomous unmanned vehicles in executing a mission plan. The computer program product includes: a first instruction for performing situation analysis, mission planning, mission replanning, mission plan execution, and collaboration between the autonomous unmanned vehicles; a second instruction for identifying safety critical components of the plurality of components; a third instruction for identifying security sensitive components of the plurality of components; a fourth instruction for isolating the safety critical components from contamination by other components of the plurality of components; and a fifth instruction for isolating security sensitive data from contaminating non-security sensitive components of the plurality of components.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a schematic representation of yet another part of the system of FIG. 1;

FIG. 6 is a schematic representation of still another part of the system of FIG. 1;

FIG. 7 is a schematic representation of yet another a part of the system of FIG. 1;

FIG. 8 is a schematic representation of still another a part of the system of FIG. 1;

FIG. 11 is a schematic representation of yet another a part of the system of FIG. 1;

DESCRIPTION OF AN EXAMPLE EMBODIMENT

A system in accordance with the present invention defines an infrastructure for autonomous planning and control of collaborating teams of unmanned vehicles. The system may extend a proposed collaborative autonomy control system. The system provides a processing platform on which collaborative autonomy may be executed. The system may partition data and processing on the basis of safety criticality, as well as security classification. In addition, the system may provide a platform more suitable to the flexibility and adaptability demands of collaborative autonomy than conventional approaches.

Figure 1:
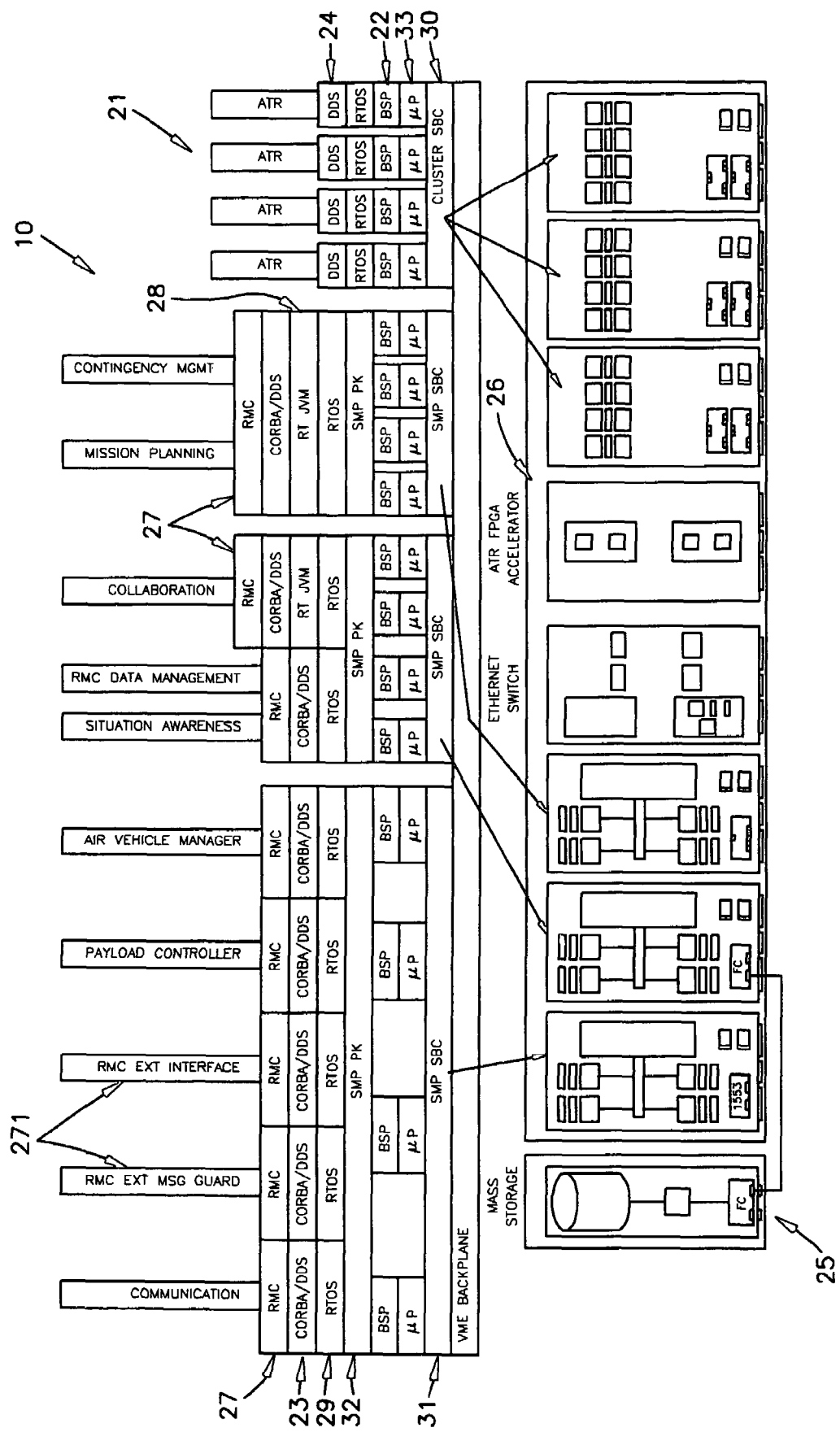
FIG. 1 is a schematic representation of a system in accordance with the present invention.

As shown in FIG. 1, an example system 10 may define a platform on which to build a scalable autonomous collaborative infrastructure. The system 10 includes the following components: ATR (Automatic Target Recognition) 21, BSP (Board Support Package) 22, CORBA (Common Object Request Broker Architecture) 23, DDS (Data Distribution Service) 24, FC (Fiber Channel) 25, FPGA (Field Programmable Gate Array) 26, RMC (Resource Meta-Controller) 27, RT JVM (Real Time Java Virtual Machine) 28, RTOS (Real Time Operating System) 29, SBC (Single Board Computer) 30, SMP (Symmetric Multiprocessor) 31, SMP Partitioned Kernel) 32, and µP (Microprocessor) 33. The Resource Meta-Controller 27 is shown with some subcomponents separated including an external interface 271 for communication to external systems without use of a communication component. The external interface 271 may transfer information using other protocols (e.g., Ethernet, etc.).

Figure 2:
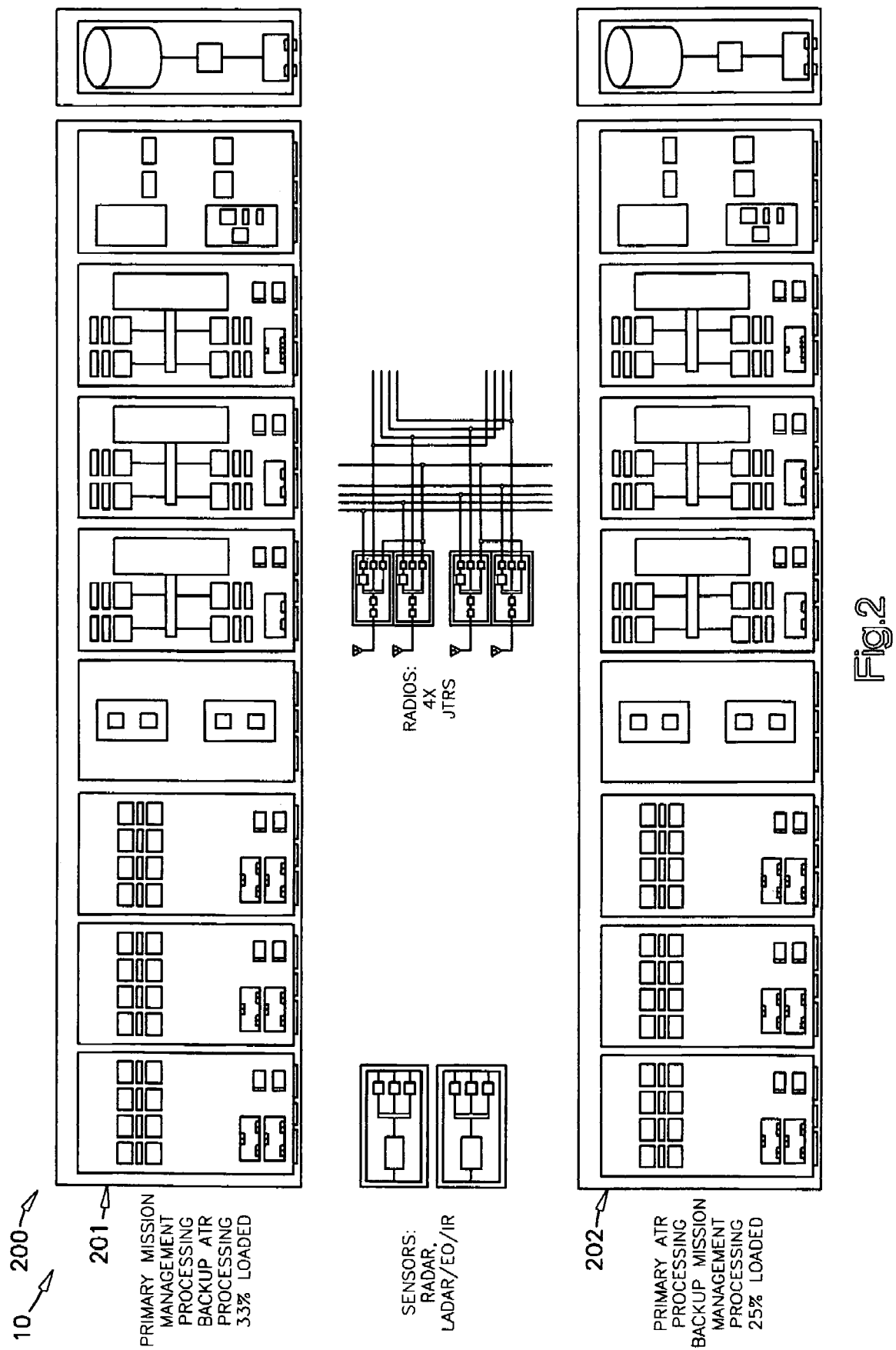
FIG. 2 is a schematic representation of a part of the system of FIG. 1.

The system 10 may implement a highly modular architecture that includes redundancy for fault tolerance, as well as capacity for contingency planning algorithms. As shown in FIG. 2, the system 10 may include a dual redundant processor configuration with a workload partitioned into two major elements, an ATR workload and a Mission Management workload. The ATR workload and the Mission Management workload may be distributed across the redundant processors. This approach differs from conventional approaches, which assign an entire workload to one primary processor with a redundant backup processor lightly loaded until the occurrence of an event that requires system reconfiguration.

The system 10 may also include a contingency planning capacity where under utilized processing and memory resources may apply mission planning algorithms to prepare alternative course of action for future events which may occur in a tactical situation. This contingency planning capacity may enhance response time or the quality of a response in a tactical situation by utilizing resources which would otherwise be in a backup mode.

The high degree of modularity and redundancy of the system 10 may support flexibility in distribution of software workload conventionally located in embedded vehicle control systems. An example hardware architecture for the system 10 is shown in FIG. 2. The mission processor 200 may have six quad PowerPC processor boards, one-gigabit Ethernet switch board and one FPGA accelerator board in the configuration. The mass storage may be a 500-gigabyte removable media disk with dual fiber channel interfaces.

The system 10 may include two mission processors and two mass storage units that provide redundancy in the event hardware faults occur. The processing may normally (in a fault free system) be divided between the two mission processors. One mission processor 201 may host mission management processing as its primary workload while the other mission processor 202 may host automatic target recognition (ATR) processing as its primary workload. Each mission processor 201, 202 may be configured with sufficient processing and memory resources to serve as a backup host for the other mission processor's primary workload.

The system may include two types of quad Power PC processor boards, three quad PPC symmetric multiprocessor boards, and three quad PPC cluster multiprocessor boards. The mission processor 201 may include three quad PowerPC symmetric multiprocessor modules, configured with one PMC module each providing dual 1553 and dual fiber channel external interfaces along with star fabric interconnections between the processors. The system 10 may maximize performance of the processor, I/O, and memory subsystems, high-bandwidth, low-latency connections between processor nodes, and provide a non-blocking architecture with added data paths for simultaneous data transfers.

The system 10 may provide four high performance processing nodes connected in a ring via high speed PCI-X buses. Each node may consist of a 1 GHz PowerPC 7447/A processor with 512K bytes of internal L2 cache and its own dedicated bank of DDR-250 SDRAM. Each processor node may incorporate a Marvell GT64360 Discovery-II bridge that acts as a non-blocking crossbar interface between the MPC7447/A, the DDR SDRAM, and two 64-bit, 100 MHz PCI-X buses. The Discovery-II bridge may support a PowerPC MPX mode of processor bus operation and may provide higher memory bus performance compared with a 60× bus. Each node may connect to adjacent nodes via a pair of PCI-X interfaces. Each node may have a separate port into an interprocessor messaging accelerator.

A system bus may be integrated within the mission processor 201 in a single VME card. The mass storage may include 500 Gigabytes of removable media storage.

Figure 3:
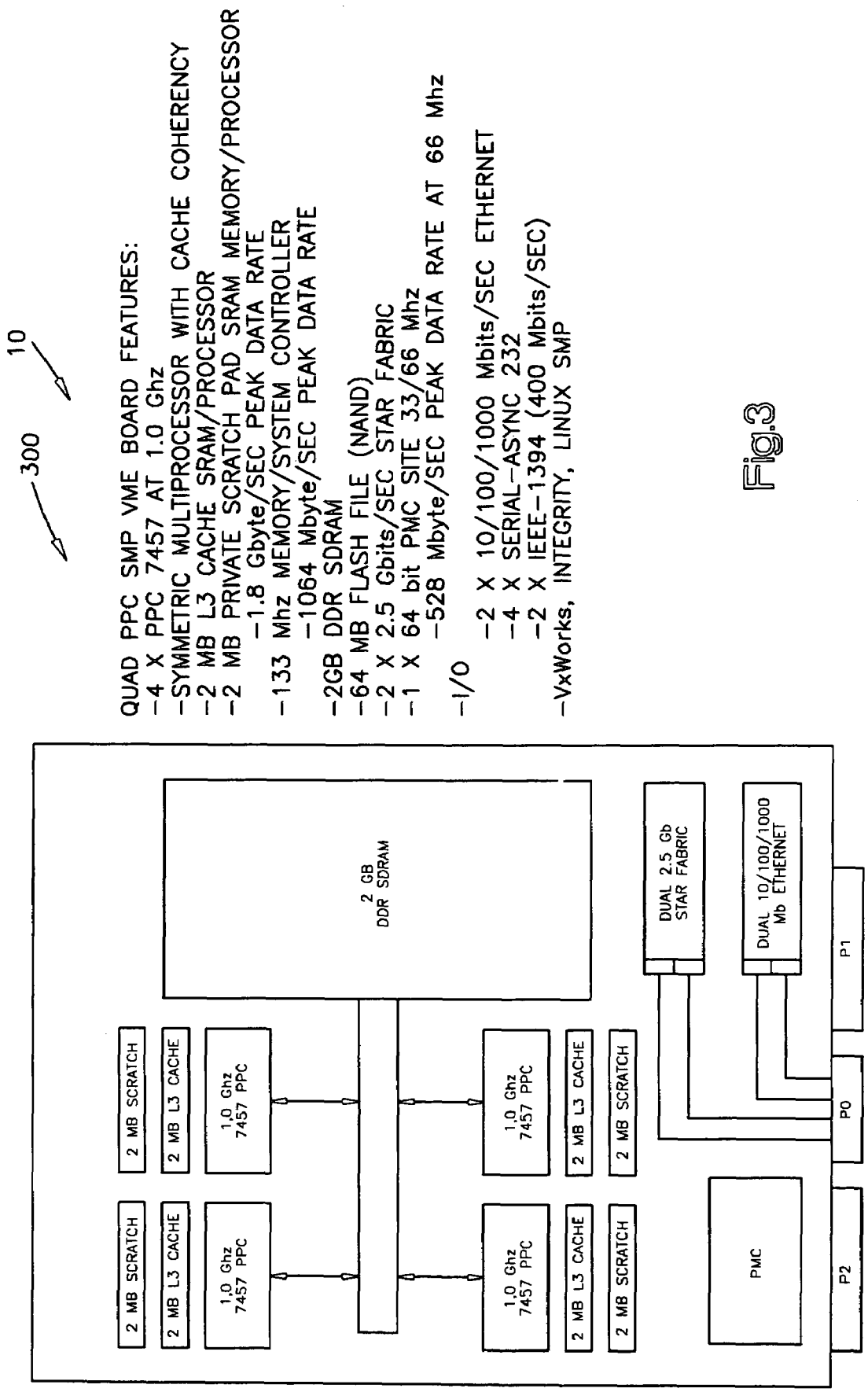
FIG. 3 is a schematic representation of another part of the system of FIG. 1.

An example Quad PPC SMP Block Diagram is shown in FIG. 3. A quad PPC SMP module 300 may be a single slot VME card which contains four of the fastest PowerPC processors available to date (e.g., the 7457) delivering 1.0 GHz performance with a roadmap to higher speeds. Offered in a quad processor configuration, the baseline quad PPC card may offer unprecedented symmetric multiprocessor capability and performance combined with lower power consumption of the 7457.

Each processor may include three levels of enhanced cache memory. The L1 and L2 caches may be integrated with a CPU core, and may operate at speeds approaching the frequency of the processor. This eight-way associativity may provide better system coverage—locating data faster and more efficiently. The 7457 may provide up to 2 MB of backside L3 cache as well as an optional 2 MB of private memory, which may function as a high-speed "scratch pad" memory. The baseline quad PPC/SMP may complement the 7457 processor with the Discovery II advanced memory/system controller—a single chip that integrates fast memory, dual PCI buses, and abundant I/O functionality, all routed through a high-bandwidth crossbar.

Figure 4:
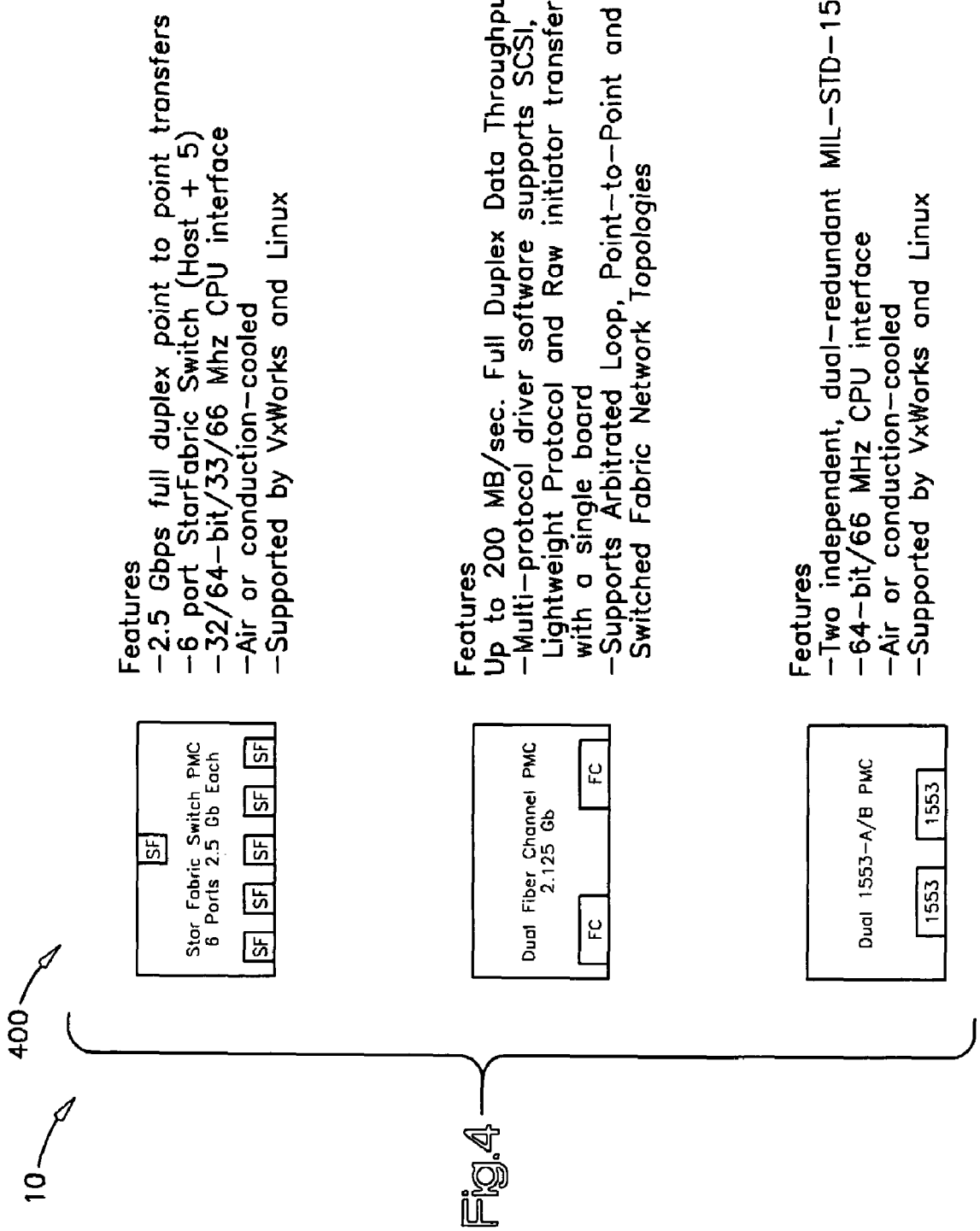
FIG. 4 is a schematic representation of still another a part of the system of FIG. 1.

Example Quad PPC SMP PMC modules 400 are shown in FIG. 4. The module card may have one PMC slot supporting the addition of a variety of additional I/O interfaces including a dual 1553 module, a star fabric switch module, and/or a dual fiber channel module. These PMC modules 400 may be used to extend the I/O capabilities of the processor modules 300.

An example Quad PPC SMP with Fiber Channel PMC module 500 is shown in FIG. 5. The dual fiber channel may support two full duplex arbitrated loop fiber channel interfaces.

An example Quad PPC SMP with Star Fabric module 600 is shown in FIG. 6. The star fabric switch may support high performance interfaces of up to five additional star fabric ports.

An example Quad PPC SMP with Dual 1553 module 700 is shown in FIG. 7. The dual 1553 interface may support an interface to legacy avionics subsystems.

Figure 9:
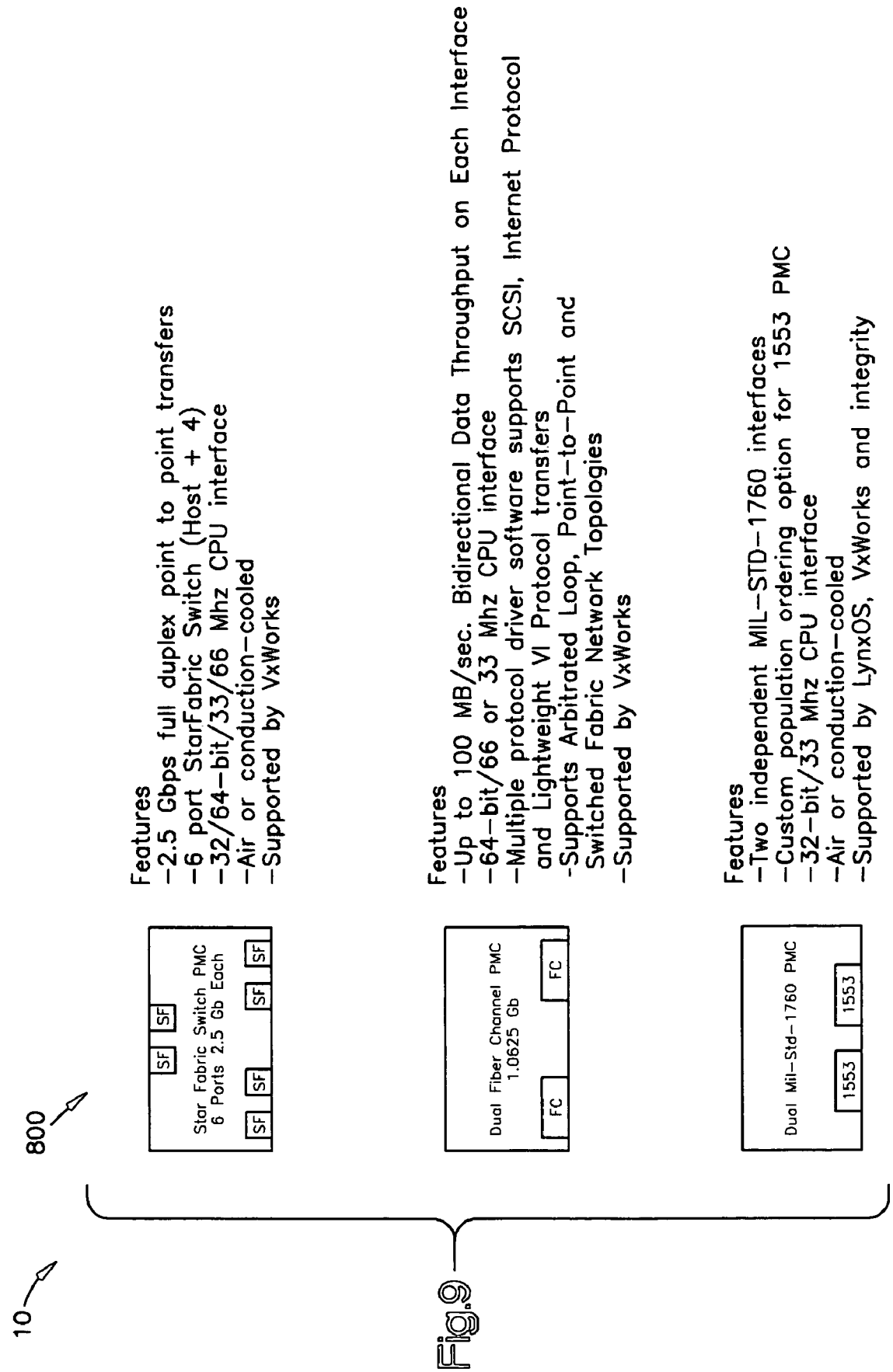
FIG. 9 is a schematic representation of yet another a part of the system of FIG. 1.

An example Quad PPC Cluster Block Diagram is shown in FIGS. 8 and 9. The Quad PPC Cluster board 800 may be a third generation quad PowerPC Altivec DSP board. The cluster board 800 may introduce an architecture based on the latest technology PowerPC and PCI-X bridge devices to provide a very high bandwidth platform that maximizes the processing potential of four Motorola PowerPC MPC7447/A processors. The cluster board 800 may be particularly well suited to large, multi-slot systems. The cluster board may include two 800 MB/s (peak) PMC-X mezzanine interfaces supported for star fabric switch fabric interconnect technology, which together provide very high I/O throughput and fabric switching band-width. The cluster board 800 may have has a set of features designed to accelerate multi-processing application performance and speed the software development process. A diverse group of peripherals may enable the cluster board 800 to be readily integrated into defense and aerospace systems such as radar, sonar, and signal intelligence.

The quad PPC cluster architecture may be suited to DSP applications that place a high premium on processor to memory, processor to processor, and PMC I/O to memory bandwidth. The data flow capabilities of the cluster board 800 may ensure that applications can extract the most from the raw computing performance of the four Altivec engines. The cluster board 800 may maximize performance of the processor, I/O, and memory subsystems, provide high-bandwidth, low-latency connections between processor nodes, and provide a non-blocking architecture with added data paths for simultaneous data transfers.

The cluster board 800 may provide four high performance processing nodes connected in a ring via high speed PCI-X buses. Each node may consist of a 1 GHz PowerPC 7447/A processor with 512K bytes of internal L2 cache and its own dedicated bank of DDR-250 SDRAM. Each processor node may incorporate a Marvell GT64360 Discovery-II bridge that acts as a non-blocking crossbar interface between the MPC7447/A, the DDR SDRAM, and two 64-bit, 100 MHz PCI-X buses. The Discovery-II bridge may support the PowerPC MPX mode of processor bus operation, providing high memory bus performance compared with a 60× bus. Each node may connect to adjacent nodes via a pair of PCI-X interfaces. Each node may have a separate port into an interprocessor messaging accelerator. With each PowerPC having a dedicated bus to its own memory, application performance may not degrade as performance in shared memory designs.

In conventional multi-processing applications, overloads are typically either addressed by spreading a data set across many processors or by utilizing processors in a pipeline, with each processor performing a stage of an algorithm. In either case, the application requires transfer of data between processors. Data movement is often the conventional limiting feature of board performance rather than raw computing power.

The cluster board 800 addresses processing and data flow requirements of high performance embedded systems. Each processing node may have two independent 64-bit, 100 MHz PCI-X connections, one for each adjacent node. Separate, simultaneous transfers may occur on all four of the PCI-X segments, resulting in a peak aggregate bandwidth of 3.2 GB/s. The peak PCI bandwidth into any one node may be 1600 MB/s. High throughput translates to lower latencies in application performance.

Another advantage of the dual PCI-X connections at each node may be that transfers between adjacent nodes do not traverse a PCI-PCI bridge and thus only one PCI segment is used. This may only require a single PCI arbitration cycle, once again providing minimum latency for data transfers. The Discovery-II bridge may have an easily programmable arbitration controller that allows priority allocation between the processor, PCI, and DMA engines for access to the DDR SDRAM memory. Users may fine-tune the priority of these devices to suit the needs of their application and achieve the best possible efficiency of the memory subsystem.

Each Discovery-II bridge may provide a four-channel DMA controller that is typically used for managing transfers between processor node memory banks and transfers to and from PMC devices. These architectural features of the cluster board will simplify and accelerate the process of application development.

The system may allow users to focus on objectives of a mission, rather than optimizing the use of hardware that may restrict data flow of one or two simultaneous transactions. A memory map of a cluster board may allow any processor to access the memory of any other processor and both PMC sites. Any PMC module, or a VME master, may access any of the processor node memories.

Each processor node on the cluster board may consist of either 128 or 256 Mbytes of Double Data Rate (DDR) SDRAM. The instantaneous peak data transfer rate to the DDR-250 SDRAM may be 2.0 GB/s at 125 MHz. The DDR SDRAM may be accessible from the processor and from both PCI buses. Via the Universe-II PCI-to-VME interface, the DDR SDRAM may also be accessible from the VMEbus.

Figure 10:
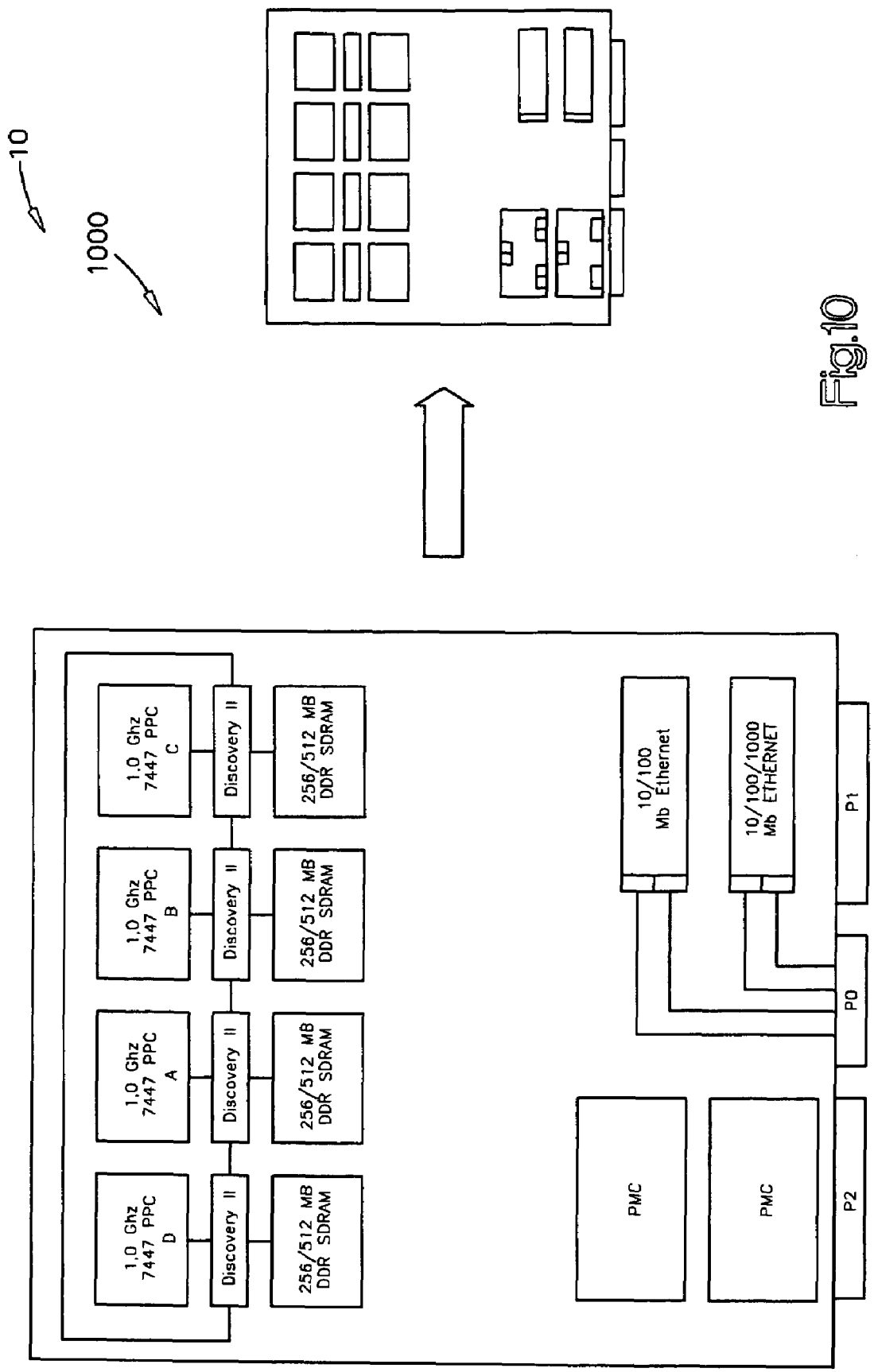
FIG. 10 is a schematic representation of still another a part of the system of FIG. 1.

The Quad PPC Cluster with Star Fabric and Fiber Channel PMC modules 1000 is shown in FIG. 10. An Ethernet Switch with 20 Ports 1100 (FIG. 11) may support up to 20 10/100/1000 Megabit per second interfaces. The Ethernet Switch card may implement a system bus function in a single VME card. The Ethernet Switch may include a fully managed, intelligent multi-layer gigabit Ethernet Switch, a 6U VME 64× form factor, up to twenty-four (20 Base+4 PMC) 10/100/

1000 Mbps non-blocking, auto-negotiating ports, a convection and conduction cooled ruggedization, integrated functions (i.e., Layer 2 switching, Layer 3 routing, Quality of Service (QoS), IP multicast, security, and Network Management Interfaces including command line, web, and SNMP. The Ethernet Switch may further include Dual Broadcom BCM5690 managed switch devices, Motorola MPC8245 control and management processor with 64 Mbyte SDRAM with ECC, 4 Mbyte boot flash, and 32 Mbyte configuration flash, out of band backplane management and debug 10/100 Base Tx Ethernet interface, and JTAG debug support and serial interface.

Figure 12:
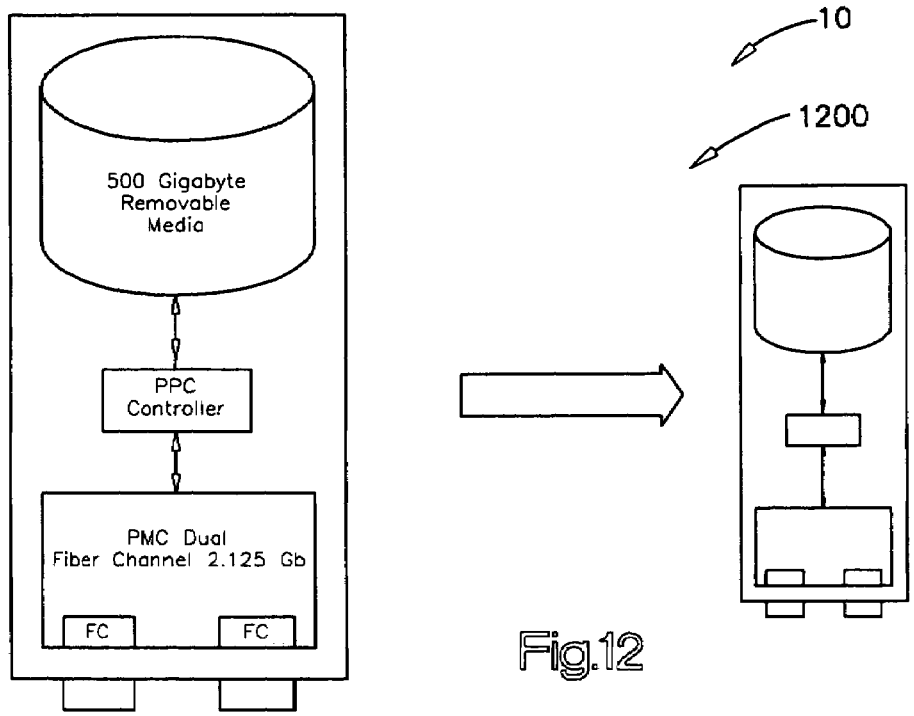
FIG. 12 is a schematic representation of still another a part of the system of FIG. 1.

Network File System Mass Storage is shown in FIG. 12. The mass storage may provide 500 Gigabytes of removable storage.

A hardware layer may be a physical implementation of the system 10. The hardware layer may be a physical processing resource that the system 10 may run on. As part of the hardware layer, a Board Support Package (BSP) layer may abstract hardware away from an operating system layer and higher layers of software. The BSP may allow hardware upgrades and modifications having zero to little impact on code of higher layer software.

The BSP also may provide interfaces and services to all hardware components. The BSP may allow application layers to access hardware with a standard interface without recognizing actual physical interfaces.

An operating system (OS) may provide a base structure and resources required for running software. The OS may schedule tasks, system I/O, and resource management. The OS may provide a software platform on top of which other programs may run.

A Real-Time Operating System (RTOS) is a type of OS that may provide predictable priority-based scheduling and low latency performance. The RTOS may be used for systems or parts of systems that require real-time performance.

A service layer may include various application interfaces that allow access to common functionality. Middleware may reside in the service layer along with a graphics subsystem and specific language virtual machines. These Application Programming Interfaces (API) may allow the application layer to transparently and seamlessly access common functionality.

In a conventional complex modular system, it is essential to move data from one process to another for complex computing processes. A conventional system typically crosses a processor boundary. Thus, ideally data is distributed to different processors in an ordered and timely fashion. In the absence of middleware, an application developer may utilize an operating system's socket application programming interface to send data from one machine or process to another machine or process. However, this operation does not scale well when applications become more complex and data changes.

Therefore, in the service layer of the system 10, a socket application programming interface, or any other necessary communication interface, may be wrapped by a standard interface that provides a higher level of abstraction. This may allow an application programmer more flexibility in communicated data. An application programmer may not be aware of the location upon which a receiving entity is executed.

This service layer may consist of software modules (or application components) that comprise various applications required by the program. These application components may be portable, in accordance with object oriented software engineering principles. The application components may be insulated from internal details of any other software modules, the hardware, and/or I/O layers. The application components are, therefore, not tied to any physical hardware and may function on any hardware entity with available processing capacity and required I/O services.

The software architecture of the system 10 may be component-based. The software architecture may be based on open commercial standards and may utilize an application framework to encourage development of standardized components, which may shorten development cycle and reduce development costs. The software architecture may also isolate application software from the operating system and hardware thereby minimizing impact of hardware changes.

FIG. 1 shows an example of a high-level implementation for developing a Mission Processor Architecture. This example implementation may use a layered approach as a foundation application software. Application software components may be placed on top of this foundation and plugged into the system 10 using standard APIs. The Mission Processor Architecture may be applied to all processor cards in the processor chassis. There may be three processors allocated to host two operating systems. The operating systems may be selected to support specific characteristics of the components in the Mission Processor. In FIG. 1, a Real-Time Operating System (RTOS) is hosted on one processor card to support components that have real-time or near real-time requirements. The RTOS also may support partitioning for implementing safety critical software and supporting multi-level security requirements.

FIG. 1 also shows component allocations to partitions and partition allocation to SBC. The applications running in RTOS partitions may be written in C/C++. Components allocated to partitions supporting RT JVM may be written in either C++ or Java. Java may be used where possible, C++ may be used when necessary or when it is advantageous (i.e., for reuse, etc.).

Since this example OS is a Shared Multi-Processing (SMP) OS, only one partition may be required. The SMP of the system 10 may abstract the multi-processor configuration to a single unified processor view. Thus, application components may not be allocated to processors as part of the development, but may be assigned at runtime by the OS. Due to processing requirements of the components allocated to the RT JVM environment, two single board computers may be configured to support the architecture. Application subcomponents with CORBA interfaces may be allocated to either processor with no subcomponent of the application knowing where any other subcomponent is located. CORBA also may facilitate communication between programs written in different languages. The RT JVM components may be written in a combination of C/C++ and Java.

The following paragraphs describe an example selection made for each layer in the example architecture. The interface between the hardware and the operating system is the Board Support Package (BSP). The BSP provides for a high degree of portability due to the highly modular nature of the operating system, which may isolate all hardware-specific features into a special section of code. The BSP may consist of initialization code for the hardware devices as well as device drivers for all hardware peripherals that may be supported on the embedded board design.

The example operating system shown in FIG. 1 consists of two components, a SMP Partitioned Kernel (PK) and an RTOS. These components are a layer above the processor and the Board Support Package (BSP). The PK may be a very small kernel that provides secure partitioning and prevents unauthorized data transfer between partitions. The secure partitioning supports the development of software that is DO-178B (flight safety critical) compliant. On top of the PK are RTOS instances. The RTOSs may provide the APIs and services to the application and middleware layers above the OS layer. The implementation of software that meets Multiple Independent Levels of Security (MILS) requirements may require software that is certified to Common Criteria EAL levels. This certification, particularly at EAL7, may require extensive analysis of code and may therefore be limited to relatively small sections of code. The PK may be compatible with both the functionality and size for achieving EAL7 certification.

The RTOS may provide real-time periodic tasks, mutexes, priority inheritance, and a fully preemptive kernel. The operating system may utilize hardware memory management functions to provide each component with a dedicated address space to isolate and protect its memory. This dedicated address space may guarantee that a component cannot modify memory space of other components.

The RTOSs may run middleware within their own partitions of the Partition Kernal (PK). The PK is a shared multiprocessor (SMP) kernel. Thus, there is no direct mapping of a partition to a processor. Although the RTOS is not SMP, so any partition in which it is the RTOS will be allocated to part of a single processor, future OS's may take advantage of all four processors for processes and POSIX threads.

The collaborative autonomy system 10 may use CORBA and Distributed Data Service (DDS) to communicate between components. This communication layer may also provide the partition communication service (PCS) that supports message passing in a multi-level security environment. The PCS may use encryption to ensure that classified data passing over a LAN may not be interpreted by software running at a lower security level. The CORBA/DDS product may abstract communication between partitions, processors, SBC cards, and/or network nodes to a single interface.

Java may be included in the architecture for support and rapid prototyping of new algorithms. A real-time java virtual machine (RT JVM) may provide preemptible garbage collection for better behavior of process scheduling. The RT JVM may also support a full J2SE specification. This support may provide close compatibility with non-Embedded Java and optimal reuse potential.

Frequently accessed data may be stored as an in-memory database to facilitate efficient data retrieval. Some data may have several non-trivial queries that justify use of a database rather than implementing data structures. In-memory databases may be uniquely tuned to support the fastest possible response since the in-memory databases may assume that the entire database resides in memory. Although disk based databases may cache the entire database in memory for as long as the entire database will fit, disk based databases must account for optimizing disk access, rather than memory access.

Mission data, debug data, and other data may be stored on a hard disk. A disk-based database may be used in conjunction with an in-memory database to store history of frequently accessed data.

The Resource Meta-Controller (RMC) may define an infrastructure layer that is part of the application. The following paragraphs describe an example infrastructure supported by the RMC used by the other components of the system 10.

The RMC may abstract communications between processes belonging to other components in a Mission Processor. The RMC may also provide transparent custom interfaces to other processors. Basic communication throughout the collaborative autonomy system 10 may be a publish/subscribe message implemented via a distributed data service (DDS). The DDS may be part of a middleware layer. This configuration may support an effective one-to-many interface since many components have behaviors associated with a single event. The configuration may also provide an effective mechanism for maintaining synchronization of databases among different processors.

In addition to inter-component/inter-process communication, the RMC may support an agent-based architecture for the Mission Planning, Contingency Management, Collaboration, and Situation Awareness components in the Mission Processor. The system 10 may enhance effectiveness of these components by allowing dynamic allocation of resources including memory and processor without non-deterministic, non-real-time responses.

Agents may support a means of implementing semantic importance to tasks and allowing for the termination of less important tasks in favor of more important tasks. This is useful for decision-making algorithms that may compute valid results in a minimum time, but compute better results given more time. This agency approach may allow such algorithms to use all available processing capability.

The agent-based architecture may also support effective use of resources. Agents may only be allocated when needed, and not statically. Thus, resources used by an agent are only allocated when the agent runs, and are returned when the agent terminates. Since resources are not statically allocated, the resources may be allocated anywhere that sufficient resources exist. The agent-based components may be separated from real-time components using separate hardware and/or kernel partitioning to ensure that real-time performance is not impacted.

Because safety critical and security issues may be partitioned in the infrastructure architecture, the higher-level collaborative autonomy control system in accordance with the present invention may focus on collaborative autonomy, and not on safety and security. While safety and security cannot be ignored, especially for safety critical components, safeguards in the infrastructure of the present invention may permit a change in focus and, therefore, an improvement in efficiency and effectiveness. The control system further reduces time and effort required to assess and, if necessary, certify safety and security impacts of changes to the control system.

The flexible nature of the infrastructure (e.g., SMP or not, RTOS or not, RT JVM or not), combined with the flexible decoupling provided by CORBA and DDS, provide the greater degree of flexibility and configurability desired by the collaborative autonomy control system. Further, the flexible nature of processing redundancy allows either processor to perform the duties of the other in addition to its own with a degradation in performance, but not a degradation in functionality.

As shown in FIG. 2, an example collaborative system 10 controls teams of unmanned vehicles during execution of a mission plan. The system 10 includes a first processor 201 and a second processor 202. The first processor 201 manages the teams of unmanned vehicles. The first processor 201 has a first workload. The second processor 202 recognizes targets. The second processor 202 has a second workload. The first processor 201 serves as a backup host for the second workload. The second processor 202 serves as a backup host for the first workload.

Figure 13:
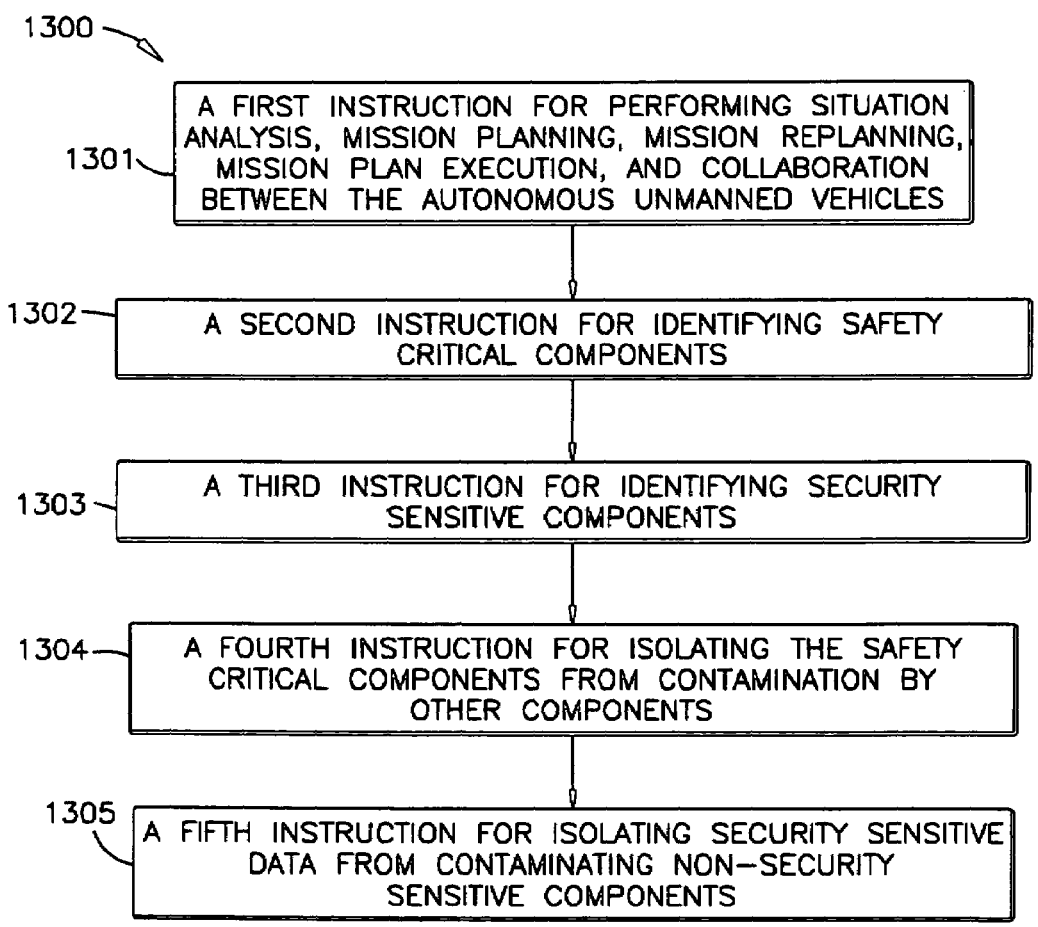
FIG. 13 is a schematic representation of an example computer program product in accordance with the present invention.

As shown in FIG. 13, an example computer program product 1300 ensures safety and security of teams of collaborative autonomous unmanned vehicles in executing a mission plan. The computer program product 1300 includes: a first instruction 1301 for performing situation analysis, mission planning, mission replanning, mission plan execution, and collaboration between the autonomous unmanned vehicles; a second instruction 1302 for identifying safety critical components of the plurality of components; a third instruction 1303 for identifying security sensitive components of the plurality of components; a fourth instruction 1304 for isolating the safety critical components from contamination by other components of the plurality of components; and a fifth instruction 1305 for isolating security sensitive data from contaminating non-security sensitive components of the plurality of components.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for ensuring safety and security of teams of collaborative autonomous unmanned vehicles in executing a mission plan, said system comprising:
 a plurality of components for performing situation analysis, mission planning, mission replanning, mission plan execution, and collaboration between the autonomous unmanned vehicles;
 a first device for identifying safety critical components of said plurality of components;
 a second device for identifying security sensitive components of said plurality of components; and
 a third device for isolating said safety critical components from contamination by other components of said plurality of components, said third device isolating security sensitive data from contaminating non-security sensitive components of said plurality of components.

2. The system as set forth in claim 1 wherein said components include a said mission planning component for performing said mission planning for creating a mission plan for the teams of collaborative autonomous unmanned vehicles.

3. The system as set forth in claim 1 wherein said components include a said collaboration component for performing said collaboration for assigning roles for each member of the teams of collaborative autonomous unmanned vehicles.

4. The system as set forth in claim 1 further including a vehicle management component for generating route commands for the teams of collaborative autonomous unmanned vehicles.

5. The system as set forth in claim 4 wherein the route commands are based on a mission plan created by said mission planning component and roles assigned by said collaboration component.

6. The system as set forth in claim 5 further including a contingency management component for monitoring unexpected influences that affect success of the team mission plan.

7. The system as set forth in claim 1 further including a situational awareness component for performing fusion of data from the teams of collaborative autonomous unmanned vehicles.

8. The system as set forth in claim 1 further including a resource meta-control component for providing processing and memory resources for the teams of collaborative autonomous unmanned vehicles.

9. The system as set forth in claim 1 wherein said components include a said mission planning component for developing a collaborative synchronized plan for the teams of collaborative autonomous unmanned vehicles, said collaborative synchronized plan governing sensor deployment, flight paths, communication, and engagements.

10. The system as set forth in claim 9 wherein said collaborative synchronized plan further governs information dissemination to the teams of collaborative autonomous unmanned vehicles.

11. A computer readable medium having a computer program product for ensuring safety and security of teams of collaborative autonomous unmanned vehicles in executing a mission plan, said computer program product comprising:
 a first instruction for performing situation analysis, mission planning, mission replanning, mission plan execution, and collaboration between the autonomous unmanned vehicles;
 a second instruction for identifying safety critical components;
 a third instruction for identifying security sensitive components;
 a fourth instruction for isolating the safety critical components from contamination by other components; and
 a fifth instruction for isolating security sensitive data from contaminating non-security sensitive components.

12. The computer readable medium as set forth in claim 11 further including a sixth instruction for creating a mission plan for the teams of collaborative autonomous unmanned vehicles.

13. The computer readable medium as set forth in claim 11 further including a sixth instruction for assigning roles to the teams of collaborative autonomous unmanned vehicles.

14. The computer readable medium as set forth in claim 11 further including a sixth instruction for generating route commands for the teams of collaborative autonomous unmanned vehicles.

15. The computer readable medium as set forth in claim 14 further including a seventh instruction for basing the route commands on a mission plan and assigned roles.

16. The computer readable medium as set forth in claim 11 further including a sixth instruction for detecting a contingency, assessing an impact of the contingency, and identifying the contingency as a mission plan violation.

17. The computer readable medium as set forth in claim 11 further including a sixth instruction for issuing alerts to the teams of collaborative autonomous unmanned vehicles that a mission plan no longer satisfies objectives and constraints.

18. The computer readable medium as set forth in claim 11 further including a sixth instruction for dynamically re-teaming the teams of collaborative autonomous unmanned vehicles for executing a mission plan.

19. The computer readable medium as set forth in claim 11 further including a sixth instruction for distinguishing disciplines of members of the teams of collaborative autonomous unmanned vehicles.

20. A method for ensuring safety and security of teams of collaborative autonomous unmanned vehicles in executing a mission plan, said method comprising the steps of:
 performing situation analysis, mission planning, mission replanning, mission plan execution, and collaboration between the autonomous unmanned vehicles;
 identifying safety critical components;
 identifying security sensitive components;
 isolating the safety critical components from contamination by other components; and
 isolating security sensitive data from contaminating non-security sensitive components.

* * * * *